«12» United States Patent
Chang et al.

(10) Patent No.: US 9,406,116 B2
(45) Date of Patent: Aug. 2, 2016

(54) ELECTRONIC DEVICE AND METHOD FOR MEASURING POINT CLOUD OF AN OBJECT

(71) Applicant: Zijilai Innovative Services Co., Ltd., Shenzhen (CN)

(72) Inventors: Chih-Kuang Chang, New Taipei (TW); Xin-Yuan Wu, Shenzhen (CN); Yi Liu, Shenzhen (CN)

(73) Assignee: Zijilai Innovative Services Co., Ltd., Shenzhen (CN)

( * ) Notice: Subject to any disclaimer, the term of this patent is extended or adjusted under 35 U.S.C. 154(b) by 117 days.

(21) Appl. No.: 14/338,552

(22) Filed: Jul. 23, 2014

(65) Prior Publication Data

US 2015/0030253 A1 Jan. 29, 2015

(30) Foreign Application Priority Data

Jul. 24, 2013 (CN) ........................ 2013 1 03141882

(51) Int. Cl.
| | |
|---|---|
| *G06T 7/00* | (2006.01) |
| *G06T 19/20* | (2011.01) |
| *G06T 17/20* | (2006.01) |
| *G01B 21/20* | (2006.01) |
| *G06K 9/00* | (2006.01) |
| *G06K 9/62* | (2006.01) |
| *G06T 17/30* | (2006.01) |

(52) U.S. Cl.
CPC ................ *G06T 7/001* (2013.01); *G01B 21/20* (2013.01); *G06K 9/00214* (2013.01); *G06K 9/6211* (2013.01); *G06T 7/0032* (2013.01); *G06T 17/30* (2013.01); *G06T 19/20* (2013.01); *G06T 2200/08* (2013.01); *G06T 2207/10028* (2013.01); *G06T 2207/30164* (2013.01); *G06T 2210/56* (2013.01)

(58) Field of Classification Search
None
See application file for complete search history.

(56) References Cited

U.S. PATENT DOCUMENTS

| | | | | |
|---|---|---|---|---|
| 2005/0114059 | A1* | 5/2005 | Chang | .................... G06Q 10/04 702/84 |
| 2009/0160852 | A1* | 6/2009 | Chang | .................... G06T 7/0057 345/419 |
| 2009/0316966 | A1* | 12/2009 | Marshall | ............... A61B 6/5217 382/128 |
| 2010/0021068 | A1* | 1/2010 | Chang | .................... G06T 7/0083 382/199 |
| 2010/0226540 | A1* | 9/2010 | Chang | .................... G01B 11/14 382/106 |

(Continued)

OTHER PUBLICATIONS

Hussain, Okada, and Niijima et al, "Efficient and Feature-Preserving Triangular Mesh Decimation"), Journal of WSCG, vol. 12, No. 1-3., ISSN 1213-6972 WSCG'2004, Feb. 2-6, 2004, Plzen, Czech Republic. Copyright UNION Agency—Science Press.*

*Primary Examiner* — Kim Vu
*Assistant Examiner* — Nathan Bloom
(74) *Attorney, Agent, or Firm* — ScienBiziP, P.C.

(57) ABSTRACT

Method of measuring a point cloud of an object includes obtaining the point cloud of the object from a storage device of the electronic device. Based on the point cloud, a triangular mesh surface is constructed and triangles of the triangular mesh surface are determined. According to the triangles, a reference plane is determined. According to the reference plane, a three dimensional (3D) object coordinate system is established. 3D object coordinates of points in the point cloud are calculated in the 3D object coordinate system. Measurement elements of a profile of the point cloud are determined and points in the point cloud corresponding to each of the measurement elements are determined. According to the 3D object coordinates of the determined points corresponding to each of the measurement elements, each of the measurement elements are fit. A distance and an angle of two fit measurement elements are calculated.

18 Claims, 3 Drawing Sheets

(56) References Cited

U.S. PATENT DOCUMENTS

| | | | |
|---|---|---|---|
| 2010/0284572 A1* | 11/2010 | Lukas | G06K 9/00201 382/107 |
| 2010/0316280 A1* | 12/2010 | Lancaster | G06K 9/00214 382/154 |
| 2010/0328682 A1* | 12/2010 | Kotake | G06T 7/0057 356/620 |
| 2011/0157176 A1* | 6/2011 | Chang | G06T 17/20 345/423 |
| 2012/0237113 A1* | 9/2012 | Chang | G01B 21/20 382/154 |
| 2013/0110461 A1* | 5/2013 | Chang | G06T 17/00 702/167 |
| 2013/0162642 A1* | 6/2013 | Chang | G06T 19/20 345/420 |
| 2013/0173216 A1* | 7/2013 | Chang | G05B 1/00 702/179 |
| 2013/0207966 A1* | 8/2013 | Chu | G06T 17/00 345/419 |

* cited by examiner

ELECTRONIC DEVICE AND METHOD FOR MEASURING POINT CLOUD OF AN OBJECT

CROSS-REFERENCE TO RELATED APPLICATIONS

This application claims priority to Chinese Patent Application No. 201310314188.2 filed on Jul. 24, 2013 in the China Intellectual Property Office, the contents of which are incorporated by reference herein.

FIELD

Embodiments of the present disclosure relate to measurement technology, and particularly to an electronic device and method for measuring a point cloud of an object using the electronic device.

BACKGROUND

When a product is measured, a user can view whether a specified profile of the product follows with a predetermined rule. Therefore, it is necessary to precisely measure the specified profile.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
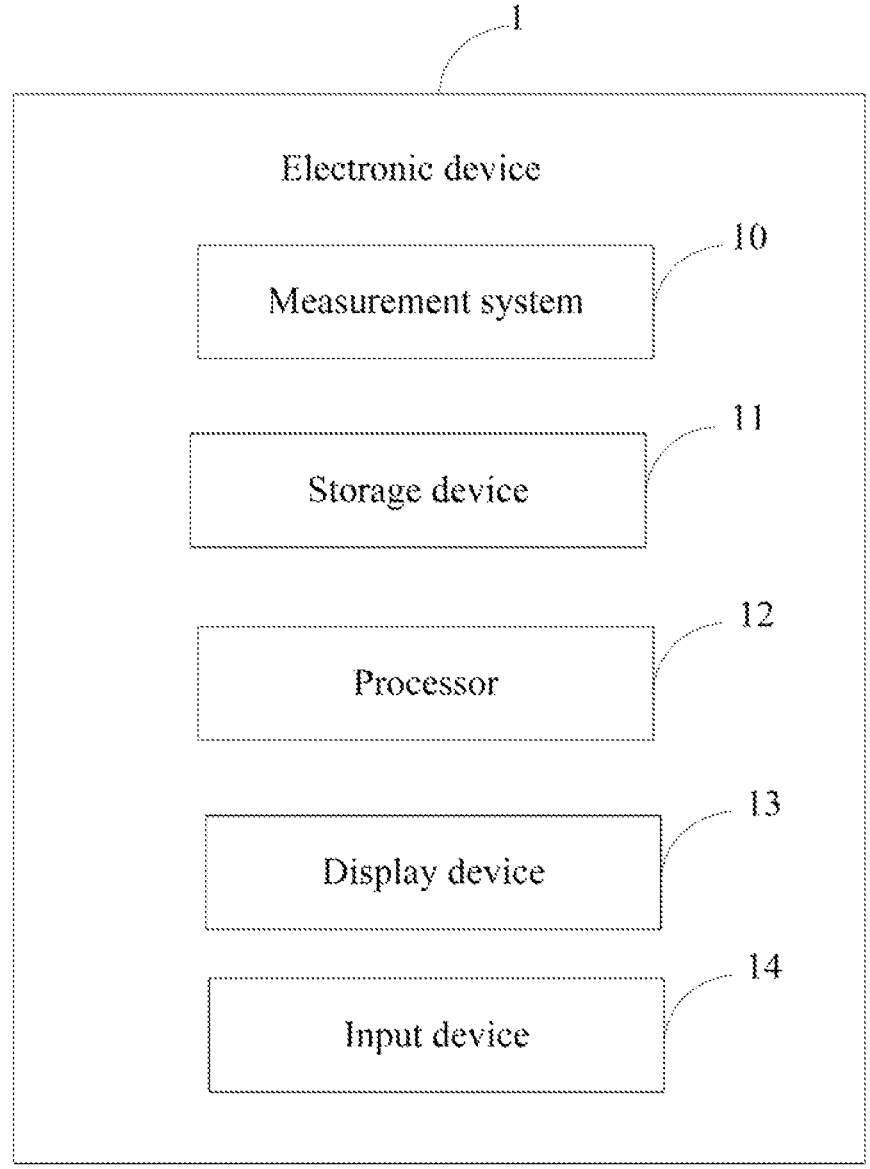
FIG. 1 is a block diagram of one embodiment of an electronic device including a measurement system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY™, flash memory, and hard disk drives.

FIG. 1 illustrates a block diagram of one embodiment of an electronic device. Depending on the embodiment, the electronic device 1 can include a measurement system 10. The electronic device 1 includes, but is not limited to, a storage device 11, at least one processor 12, a display device 13, and an input device 14. The electronic device 1 can be a computer, a smart phone, a personal digital assistant (PDA), or other suitable electronic device. It should be understood that FIG. 1 illustrates only one example of the electronic device that can include more or fewer components than illustrated, or have a different configuration of the various components in other embodiments.

The measurement system 10 can measure a profile of an object, and display a measurement result of the profile on the displaying device 13.

In at least one embodiment, the storage device 11 can include various types of non-transitory computer-readable storage mediums, such as a hard disk, a compact disc, a digital video disc, or a tape drive. The display device 13 can display images and videos. The input device 14 can be a mouse, a keyboard, or a touch panel to input computer-readable data.

Figure 2:
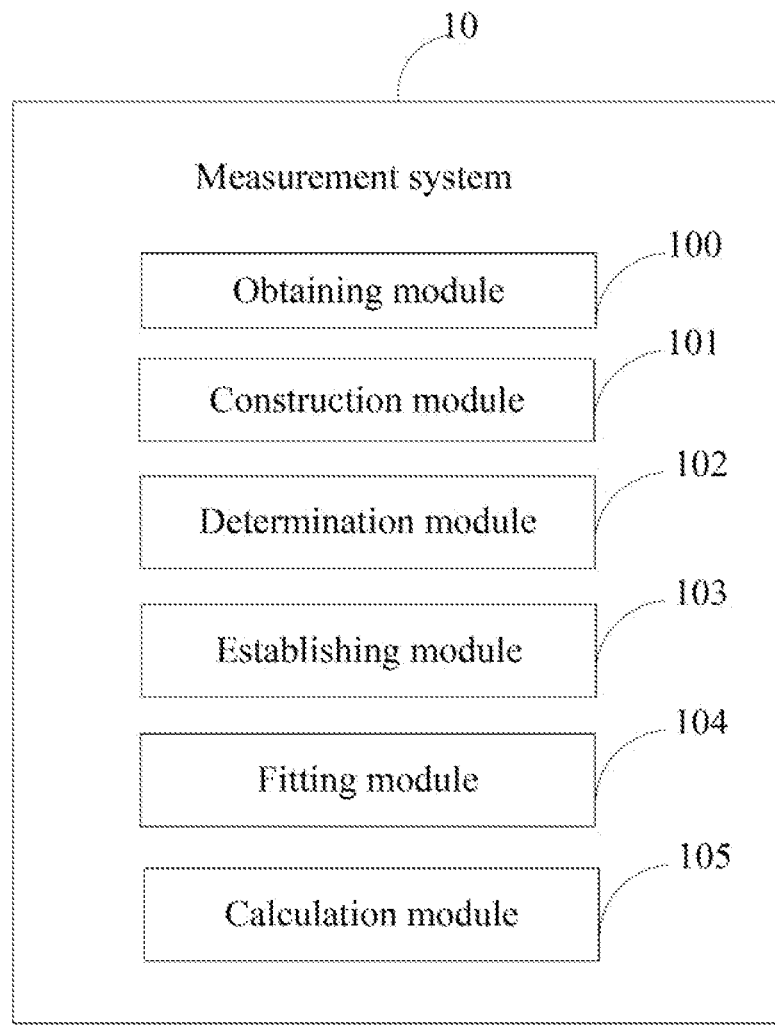
FIG. 2 is a block diagram of one embodiment of function modules of the measurement system in the electronic device of FIG. 1.

FIG. 2 is a block diagram of one embodiment of function modules of the measurement system. In at least one embodiment, the measurement system 10 can include an obtaining module 100, a construction module 101, a determination module 102, an establishing module 103, a fitting module 104, and a calculation module 105. The function modules 100, 101, 102, 103, 104 and 105 can include computerized codes in the form of one or more programs, which are stored in the storage device 11. The at least one processor executes the computerized codes to provide functions of the function modules 100-105.

The storage device 11 stores a point cloud of the object. The point cloud includes a plurality of points. The storage device 11 also stores three dimensional (3D) machine coordinates of the points in the point cloud. The obtaining module 100 obtains the point cloud.

Based on the point cloud, the constructing module 101 constructs a triangular mesh surface, and determines triangles of the triangular mesh surface. The triangles are stored in a queue.

According to the triangles stored in the queue, the determination module 102 determines a reference plane. In at least one embodiment, a profile of the object is determined according to a predetermined line set by a user. The predetermined line is labeled on a drawing of the object. The drawing can be stored in the storage device 11. The determination module 102 can acquire the predetermined line from the drawing. In another embodiment, the drawing is displayed on the display device 13, and the predetermined line is labeled on the drawing. The user can select specified points on the predetermined line. According to the specified points, the determination module 102 can acquire the predetermined line.

The profile is determined by stretching the predetermined line using a plane stretching method. The predetermined line is stretched along a direction that is perpendicular to an average normal direction of the triangles stored in the queue. For example, triangles B1, B2, and B3 are stored in the queue. A normal direction of the triangle B1 is 30 degrees, a normal direction of the triangle B2 is 60 degrees, and a normal direction of the triangle B3 is 90 degrees. An average normal direction of the triangles is (30+60+90)/3=60. Therefore, the predetermined line can be stretched at 60 degree angle.

The determination module 102 calculates intersection points between the profile and each side of each of the triangles stored in the queue. The intersection points are stored in an array. The fitting module 104 fits the intersection points to be a fit profile using a fitting method.

The determination module 102 adjusts the fit profile to be the reference plane. In at least one embodiment, the determination module 102 determines a front view of the fit profile by projecting the specified profile onto a projection plane. An angle is calculated between the fit profile and the front view. A center of the front view and a center of the fit profile are calculated. According to the angle between the fit profile and the front view, the determination module 102 rotates the fit profile until the fit profile is parallel to the front view. According to the calculated center of the front view and the calculated center of the fit profile, the determination module 102 shifts the center of the fit profile to the center of the front view, and obtains the fit profile to be the reference plane.

According to the reference plane, the establishing module 103 establishes a 3D object coordinate system, and calculates 3D object coordinates of the points in the point cloud in the 3D object coordinate system.

In at least one embodiment, the establishing module 103 receives elements selected on a user interface provided on the display device 13. The elements can include, but are not limited to, lines, points, and circles. Then, the establishing module 103 obtains 3D machine coordinates of the points in the point cloud from the storage device 11. Based on the 3D machine coordinates of the points in the point cloud, the fitting module 104 fits the elements. The fit elements are projected on the reference plane. The projected points of the fit elements are stored in the storage device 11. Based on the projected points, the fitting module 104 fits two lines. The two lines are perpendicular to each other. An intersection point of the two lines are regarded as an origin of the 3D object coordinates system. One of the two lines is determined as an X-axis of the 3D object coordinates system, the other one of the two lines is determined as a Y-axis of the 3D object coordinates system. A Z-axis of the 3D object coordinates system is along a normal direction of the reference plane.

Measurement elements of the profile of the point cloud are labeled on the drawing. The determination module 102 acquires the measurement elements, and determines points in the point cloud corresponding to each of the measurement elements.

According to the 3D object coordinates of the determined points corresponding to each of the measurement elements, the fitting module 104 fits each of the measurement elements in the 3D object coordinate system.

The calculation module 105 calculates a distance and an angle of two fit measurement elements. In at least one embodiment, the two fit measurement elements can be any two fit measurement elements selected from all of the fit measurement elements, and the reference plane is displayed on the display device 13. The fit measurement elements are displayed on the reference plane. The distance and the angle of the two fit measurement elements are displayed on the reference plane. The user can directly view the distance and the angle of the two fit measurement elements on the display device 13.

Figure 3:
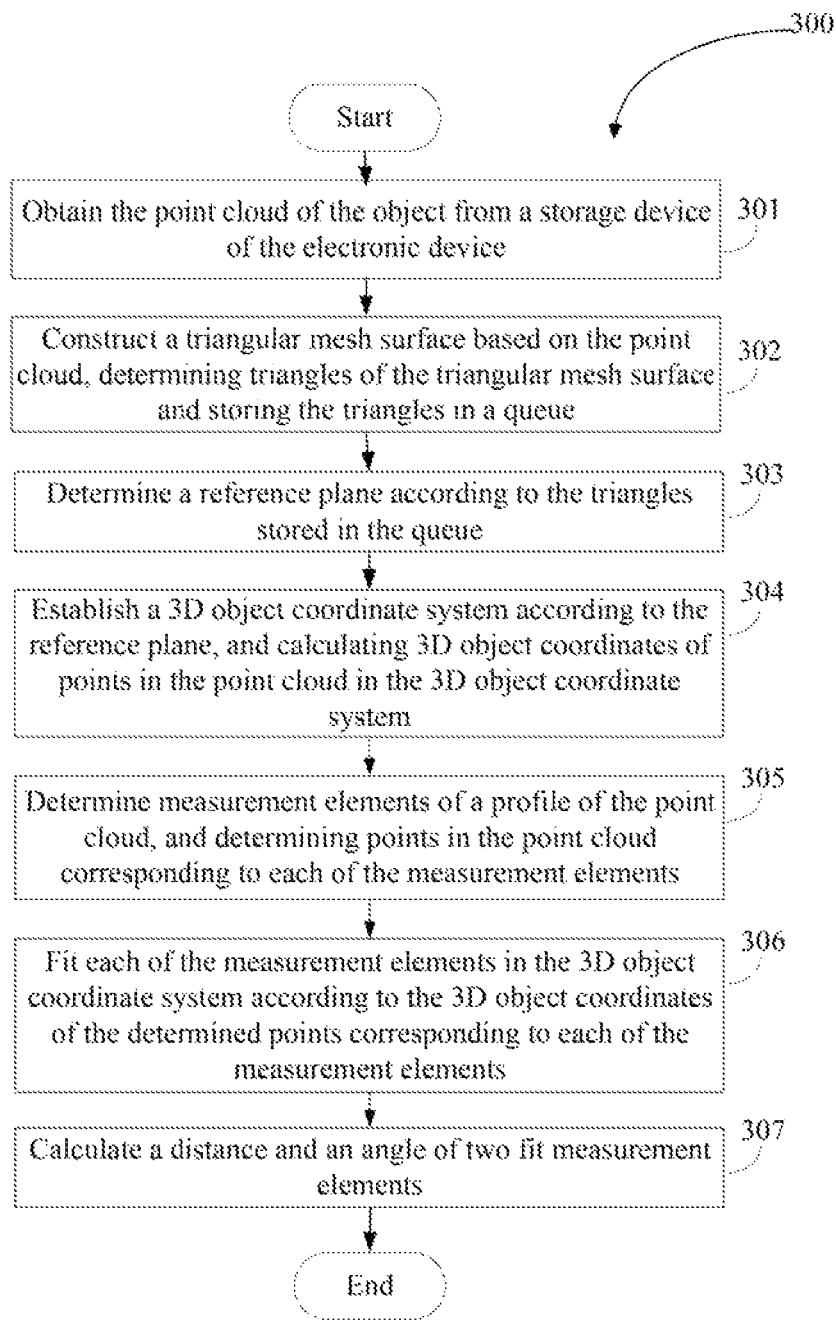
FIG. 3 illustrates a flowchart of one embodiment of a method for measuring point cloud in the electronic device of FIG. 1.

FIG. 3 illustrates a flowchart of a method 300 in accordance with an example embodiment. The method 300 is provided by way of example, as there are a variety of ways to carry out the method 300. The method 300 described below can be carried out using the configurations illustrated in FIGS. 1 and 2, for example, and various elements of these figures are referenced in explaining method 300. Each block shown in FIG. 3 represents one or more processes, methods or subroutines, carried out in the exemplary method 300. Additionally, the illustrated order of blocks is by example only and the order of the blocks can change according to the present disclosure. The exemplary method 300 can begin at block 301. Depending on the embodiment, additional steps can be added, others removed, and the ordering of the steps can be changed.

In block 301, a storage device of an electronic device stores a point cloud of an object. The point cloud includes a plurality of points. The storage device 11 also stores three dimensional (3D) machine coordinates of the points in the point cloud. An obtaining module obtains the point cloud.

In block 302, based on the point cloud, a constructing module constructs a triangular mesh surface, and determines triangles of the triangular mesh surface. The triangles are stored in a queue.

In block 303, according to the triangles stored in the queue, a determination module determines a reference plane. In at least one embodiment, a profile of the object is determined according to a predetermined line set by a user. The predetermined line is labeled on a drawing of the object. The drawing can be stored in the storage device. The determination module can acquire the predetermined line from the drawing. In another embodiment, the drawing is displayed on a display device of the electronic device, and the predetermined line is labeled on the drawing. The user can select specified points on the predetermined line. According to the specified points, the determination module can acquire the predetermined line.

The profile is determined by stretching the predetermined line using a plane stretching method. The predetermined line is stretched along a direction that is perpendicular to an average normal direction of the triangles stored in the queue. The determination module calculates intersection points between the profile and each side of each of the triangles stored in the queue. The fitting module 104 fits the intersection points to be a fit profile using a fitting method.

The determination module adjusts the fit profile to be the reference plane. In at least one embodiment, the determination module determines a front view of the fit profile by projecting the specified profile onto a projection plane. An angle is calculated between the fit profile and the front view. A center of the front view and a center of the fit profile are calculated. According to the angle between the fit profile and the front view, the determination module rotates the fit profile until the fit profile is parallel to the front view. According to the calculated center of the front view and the calculated center of the fit profile, the determination module shifts the center of the fit profile to the center of the front view, and obtains the fit profile to be the reference plane.

In block 304, according to the reference plane, an establishing module establishes a 3D object coordinate system, and calculates 3D object coordinates of the points in the point cloud in the 3D object coordinate system.

In at least one embodiment, the establishing module receives elements selected on a user interface provided on the display device. The elements can include, but are not limited to, lines, points, and circles. Then, the establishing module obtains 3D machine coordinates of the points in the point cloud from the storage device. Based on the 3D machine coordinates of the points in the point cloud, the fitting module 104 fits the elements. The fit elements are projected on the reference plane. The projected points of the fit elements are stored in the storage device. Based on the projected points, the fitting module 104 fits two lines. The two lines are perpendicular to each other. An intersection point of the two lines is regarded as an origin of the 3D object coordinates system. One of the two lines is determined as an X-axis of the 3D object coordinates system. The other one of the two lines is determined as a Y-axis of the 3D object coordinates system. A Z-axis of the 3D object coordinates system is along a normal direction of the reference plane.

In block 305, measurement elements of a profile of the point cloud are labeled on the drawing. The determination module acquires the measurement elements, and determines points in the point cloud corresponding to each of the measurement elements.

In block 306, according to the 3D object coordinates of the determined points corresponding to each of the measurement elements, a fitting module fits each of the measurement elements in the 3D object coordinate system.

In block 307, a calculation module calculates a distance and an angle of two fit measurement elements. In at least one embodiment, the two fit measurement elements can be any two fit measurement elements selected from all of the fit measurement elements, and the reference plane is displayed on the display device. The fit measurement elements are displayed on the reference plane. The distance and the angle of the two fit measurement elements are displayed on the reference plane. The user can directly view the distance and the angle of the two fit measurement elements on the display device.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A computer-implemented method for measuring a point cloud of an object using an electronic device, the method comprising:
   obtaining the point cloud of the object from a storage device of the electronic device;
   constructing a triangular mesh surface based on the point cloud;
   determining triangles of the triangular mesh surface and storing the triangles in a queue;
   determining a reference plane according to the triangles stored in the queue;
   establishing a three dimensional (3D) object coordinate system according to the reference plane;
   calculating 3D object coordinates of points in the point cloud in the 3D object coordinate system;
   determining measurement elements of a profile of the point cloud;
   determining points in the point cloud corresponding to each of the measurement elements;
   fitting each of the measurement elements in the 3D object coordinate system according to the 3D object coordinates of the determined points corresponding to each of the measurement elements; and
   calculating a distance and an angle of two fit measurement elements.

2. The method according to claim 1, further comprising:
   displaying the reference plane and the fit measurement elements on the reference plane, and displaying the distance and the angle of the two fit measurement elements.

3. The method according to claim 1, wherein the reference plane is determined by:
   acquiring a predetermined line from the storage device;
   determining the profile by stretching the predetermined line using a plane stretching method;
   calculating intersection points between the profile and each side of each of the triangles stored in the queue, and storing the intersection points in an array;
   fitting the intersection points to a fit profile using a fitting method; and
   adjusting the fit profile to be the reference plane.

4. The method according to claim 3, wherein the predetermined line is stretched along a direction that is perpendicular to an average normal direction of the triangles stored in the queue.

5. The method according to claim 3, wherein the fit profile is adjusted to the reference plane by:
   determining a front view of the fit profile by projecting the specified profile onto a projection plane;
   calculating an angle between the fit profile and the front view;
   calculating a center of the front view and a center of the fit profile;
   rotating the fit profile according to the angle between the fit profile and the front view until the fit profile is parallel to the front view;
   shifting the center of the fit profile to the center of the front view; and
   obtaining the fit profile to be the reference plane.

6. The method according to claim 1, wherein the 3D object coordinate system is established by:
   obtaining 3D machine coordinates of the points in the point cloud;
   receiving elements selected on a user interface provided on a display device of the electronic device;
   fitting the elements based on the 3D machine coordinates of the points in the point cloud;
   projecting the fit elements on the reference plane;
   storing the projected points of the fit elements; and
   fitting two lines based on the projected points and a Z-axis of the 3D object coordinates system along a normal direction of the reference plane, the two lines being perpendicular to each other, an intersection point of the two lines being regarded as an origin of the 3D object coordinates system, one of the two lines being determined as an X-axis of the 3D object coordinates system, the other one of the two lines being determined as a Y-axis of the 3D object coordinates system.

7. An electronic device comprising:
   a processor; and
   a storage device that stores one or more programs and, when executed by the at least one processor, cause the at least one processor to:
   obtain a point cloud of an object from a storage device of the electronic device;
   construct a triangular mesh surface based on the point cloud;
   determine triangles of the triangular mesh surface;
   store the triangles in a queue;
   determine a reference plane according to the triangles stored in the queue;
   establish a three dimensional (3D) object coordinate system according to the reference plane;

calculate 3D object coordinates of points in the point cloud in the 3D object coordinate system;
determine measurement elements of a profile of the point cloud;
determine points in the point cloud corresponding to each of the measurement elements;
fit each of the measurement elements in the 3D object coordinate system according to the 3D object coordinates of the determined points corresponding to each of the measurement elements; and
calculate a distance and an angle of two fit measurement elements.

8. The electronic device according to claim 7, wherein the at least one processor further displays the reference plane and the fit measurement elements on the reference plane, and displays the distance and the angle of the two fit measurement elements.

9. The electronic device according to claim 7, wherein the reference plane is determined by:
acquiring a predetermined line from the storage device;
determining the profile by stretching the predetermined line using a plane stretching method;
calculating intersection points between the profile and each side of each of the triangles stored in the queue, and storing the intersection points in an array;
fitting the intersection points to a fit profile using a fitting method; and
adjusting the fit profile to be the reference plane.

10. The electronic device according to claim 9, wherein the predetermined line is stretched along a direction that is perpendicular to an average normal direction of the triangles stored in the queue.

11. The electronic device according to claim 9, wherein the fit profile is adjusted to the reference plane by:
determining a front view of the fit profile by projecting the specified profile onto a projection plane;
calculating an angle between the fit profile and the front view;
calculating a center of the front view and a center of the fit profile;
rotating the fit profile according to the angle between the fit profile and the front view until the fit profile is parallel to the front view;
shifting the center of the fit profile to the center of the front view; and
obtaining the fit profile to be the reference plane.

12. The electronic device according to claim 7, wherein the 3D object coordinate system is established by:
obtaining 3D machine coordinates of the points in the point cloud;
receiving elements selected on a user interface provided on a display device of the electronic device;
fitting the elements based on the 3D machine coordinates of the points in the point cloud;
projecting the fit elements on the reference plane;
storing the projected points of the fit elements; and
fitting two lines based on the projected points and a Z-axis of the 3D object coordinates system along a normal direction of the reference plane, the two lines being perpendicular to each other, an intersection point of the two lines being regarded as an origin of the 3D object coordinates system, one of the two lines being determined as an X-axis of the 3D object coordinates system, the other one of the two lines being determined as a Y-axis of the 3D object e coordinates system.

13. A non-transitory storage medium having stored thereon instructions that, when executed by a processor of an electronic device, causes the processor to perform a method for measuring point cloud, wherein the method comprises:
obtaining the point cloud of the object from a storage device of the electronic device;
constructing a triangular mesh surface based on the point cloud;
determining triangles of the triangular mesh surface and storing the triangles in a queue;
determining a reference plane according to the triangles stored in the queue;
establishing a three dimensional (3D) object coordinate system according to the reference plane, and calculating 3D object coordinates of points in the point cloud in the 3D object coordinate system;
determining measurement elements of a profile of the point cloud;
determining points in the point cloud corresponding to each of the measurement elements;
fitting each of the measurement elements in the 3D object coordinate system according to the 3D object coordinates of the determined points corresponding to each of the measurement elements; and
calculating a distance and an angle of two fit measurement elements.

14. The non-transitory storage medium according to claim 13, the method further comprises:
displaying the reference plane and the fit measurement elements on the reference plane, and displaying the distance and the angle of the two fit measurement elements.

15. The non-transitory storage medium according to claim 13, wherein the reference plane is determined by:
acquiring a predetermined line from the storage device;
determining the profile by stretching the predetermined line using a plane stretching method;
calculating intersection points between the profile and each side of each of the triangles stored in the queue, and storing the intersection points in an array;
fitting the intersection points to a fit profile using a fitting method; and
adjusting the fit profile to be the reference plane.

16. The non-transitory storage medium according to claim 15, wherein the predetermined line is stretched along a direction that is perpendicular to an average normal direction of the triangles stored in the queue.

17. The non-transitory storage medium according to claim 15, wherein the fit profile is adjusted to the reference plane by:
determining a front view of the fit profile by projecting the specified profile onto a projection plane;
calculating an angle between the fit profile and the front view;
calculating a center of the front view and a center of the fit profile;
rotating the fit profile according to the angle between the fit profile and the front view until the fit profile is parallel to the front view; and
shifting the center of the fit profile to the center of the front view;
obtaining the fit profile to be the reference plane.

18. The non-transitory storage medium according to claim 13, wherein the 3D object coordinate system is established by:
obtaining 3D machine coordinates of the points in the point cloud;
receiving elements selected on a user interface provided on a display device of the electronic device;
fitting the elements based on the 3D machine coordinates of the points in the point cloud;

projecting the fit elements on the reference plane;
storing the projected points of the fit elements; and
fitting two lines based on the projected points and a Z-axis of the 3D object coordinates system along a normal direction of the reference plane, the two lines being perpendicular to each other, an intersection point of the two lines being regarded as an origin of the 3D object coordinates system, one of the two lines being determined as an X-axis of the 3D object coordinates system, the other one of the two lines being determined as a Y-axis of the 3D object coordinates system.

* * * * *